(12) United States Patent
Guo et al.

(10) Patent No.: US 9,699,468 B2
(45) Date of Patent: Jul. 4, 2017

(54) ADAPTIVE SCREEN AND VIDEO CODING SCHEME

(71) Applicant: Microsoft Technology Licensing, LLC, Redmond, WA (US)

(72) Inventors: Xun Guo, Beijing (CN); Shipeng Li, Palo Alto, CA (US); Yan Lu, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 436 days.

(21) Appl. No.: 14/176,510

(22) Filed: Feb. 10, 2014

(65) Prior Publication Data
US 2015/0229933 A1    Aug. 13, 2015

(51) Int. Cl.
*H04N 19/124*     (2014.01)
*H04N 19/186*     (2014.01)
(Continued)

(52) U.S. Cl.
CPC ............ *H04N 19/186* (2014.11); *G06K 9/36* (2013.01); *G06K 9/38* (2013.01); *G06K 9/4642* (2013.01); *G06K 9/4652* (2013.01); *G06T 9/00* (2013.01); *H04N 19/10* (2014.11); *H04N 19/103* (2014.11); *H04N 19/11* (2014.11); *H04N 19/119* (2014.11); *H04N 19/12* (2014.11); *H04N 19/124* (2014.11);
(Continued)

(58) Field of Classification Search
CPC .... H04N 19/10; H04N 19/103; H04N 19/119; H04N 19/124; G06K 9/36; G06K 9/38; G06K 9/4652; G06K 9/4642
See application file for complete search history.

(56) References Cited

U.S. PATENT DOCUMENTS 5,049,986 A * 9/1991 Aono ............... H04N 1/644
                                                              345/591
5,706,290 A    1/1998 Shaw et al.
(Continued)

OTHER PUBLICATIONS

Guo et al., "AHG8: Major-color-based screen content coding," 15th meeting of JCT-VC (Joint Collaborative Team on Video Coding of ISO/IEC JTC1-SC29/WG11 and ITU-T SG.16), Oct. 23, 2013-Nov. 1, 2013, Geneva, <<http://wftp3.itu.int/av-arch-jctve-site/>> No. JCTVC-O0182-v3, 10 pages.
(Continued)

*Primary Examiner* — Robert Hance
(74) *Attorney, Agent, or Firm* — Lee & Hayes, PLLC

(57) ABSTRACT

An adaptive screen and video coding system adaptively selects different coding schemes for coding an image block of a screen or video image based on a type of content included in the image block. The adaptive screen and video coding system further includes a screen coding scheme that classifies pixels of the image block into major colors and escape pixels and convert values of the pixels into index values assigned to the major colors and the escape pixels. Since the number of index values is usually less than a normal range of pixel values, using the index values instead of actual pixel values further facilitate compression and coding of the image block, thus improving coding accuracy and efficiency of the screen or video image. In one embodiment, the adaptive screen and video coding system may be used for screen sharing application.

20 Claims, 7 Drawing Sheets

(51) Int. Cl.
| | |
|---|---|
| H04N 19/119 | (2014.01) |
| G06K 9/38 | (2006.01) |
| G06K 9/46 | (2006.01) |
| G06K 9/36 | (2006.01) |
| H04N 19/11 | (2014.01) |
| H04N 19/10 | (2014.01) |
| H04N 19/103 | (2014.01) |
| H04N 19/463 | (2014.01) |
| H04N 19/85 | (2014.01) |
| G06T 9/00 | (2006.01) |
| H04N 19/176 | (2014.01) |
| H04N 19/12 | (2014.01) |
| H04N 19/14 | (2014.01) |

(52) U.S. Cl.
CPC .......... *H04N 19/14* (2014.11); *H04N 19/176* (2014.11); *H04N 19/463* (2014.11); *H04N 19/85* (2014.11)

(56) References Cited

U.S. PATENT DOCUMENTS

| | | | | |
|---|---|---|---|---|
| 6,748,116 | B1* | 6/2004 | Yue | G06T 9/004 382/238 |
| 2001/0036314 | A1* | 11/2001 | Yamaguchi | G06K 9/38 382/172 |
| 2001/0053248 | A1* | 12/2001 | Maeda | G06K 9/38 382/165 |
| 2004/0062312 | A1* | 4/2004 | Heuer | H04N 21/235 375/240.19 |
| 2006/0282855 | A1* | 12/2006 | Margulis | G06F 3/1431 725/43 |
| 2007/0201751 | A1* | 8/2007 | Wu | G06K 9/00456 382/232 |
| 2010/0111410 | A1 | 5/2010 | Lu et al. | |
| 2010/0158400 | A1 | 6/2010 | Lu et al. | |

OTHER PUBLICATIONS

PCT Search Report and Written Opinion mailed Apr. 13, 2015 for PCT application No. PCT/US2015/014461, 11 pages.

Ding et al., "Enable Efficient Compound Image Compression in H.264/AVC Intra Coding," Sep. 16, 2007, In IEEE International Conference on Image Processing, retrieved at <<http://research.microsoft.com/en-us/people/fengwu/compound_icip_07.pdf>> 4 pages.

Lan et al., "Compression of Compound Images by Combining Several Strategies," In IEEE 13th International Workshop on Multimedia Signal Processing, Oct. 17, 2011, retrieved at <<http://research.microsoft.com/en-us/people/fengwu/cs_mmsp_11.pdf>> 6 pages.

Lin et al., "Compound Image Compression for Real-Time Computer Screen Image Transmission," In IEEE Transactions on Image Processing, Aug. 2005, retrieved at <<http://www.cis.pku.edu.cn/faculty/vision/haopengwei/Papers/IEEE-TIP05.pdf>> 24 pages.

Lin et al., "Pseudo-2d-Matching Based Dual-Coder Architecture for Screen Contents Coding," In IEEE International Conference on Multimedia and Expo Workshops, Jul. 15, 2013, retrieved at <<http://ieeexplore.ieee.org/stamp/stamp.jsp?tp=&arnumber=6618315>> 4 pages.

Lu et al., "Virtualized Screen: A Third Element for Cloud-Mobile Convergence," In IEEE MultiMedia, vol. 18, Issue 2, Feb. 2011, retrieved at <<http://ieeexplore.ieee.org/stamp/stamp.jsp?arnumber=05754642>> 8 pages.

Miao et al., "Layered Screen Video Coding Leveraging Hardware Video Codec," In IEEE International Conference on Multimedia and Expo, Jul. 15, 2013, retrieved at <<http://ieeexplore.ieee.org/xpl/login.jsp?tp=&arnumber=6607515&url=http%3A%2F%2Fieeexplore.ieee.org%2Fiel7%2F6596168%2F6607419%2F06607515.pdf%3Farnumber%3D6607515 >> 6 pages.

Mrak et al., "Improving Screen Content Coding in HEVC by Transform Skipping," In Proceedings of the 20th European Signal Processing Conference, Aug. 27, 2012, retrieved at <<http://ieeexplore.ieee.org/stamp/stamp.jsp?tp=&arnumber=6334168>> 5 pages.

Pan et al., "A Low-Complexity Screen Compression Scheme for Interactive Screen Sharing," In IEEE Transactions on Circuits and Systems for Video Technology, vol. 23, Issue 6, Jun. 2013, retrieved at <<http://ieeexplore.ieee.org/stamp/stamp.jsp?tp=&arnumber=6422367>> 12 pages.

Shen et al., "A High-Performanance Remote Computing Platform," In IEEE International Conference on Pervasive Computing and Communications, Mar. 9, 2009, retrieved at <<http://research.microsoft.com/en-us/people/fengwu/remote_percom_09.pdf>> 6 pages.

Shen et al., "Classification-Based Adaptive Compression Method for Computer Screen Image," In IEEE International Conference on Multimedia and Expo Workshops, Jul. 9, 2012, retrieved at <<http://ieeexplore.ieee.org/stamp/stamp.jsp?tp=&arnumber=6266223>> 6 pages.

Shen et al., "Low-Cost Real-Time Screen Sharing to Multiple Clients," In IEEE International Conference on Multimedia and Expo, Jul. 19, 2010, retrieved at <<http://ieeexplore.ieee.org/stamp/stamp.jsp?tp=&arnumber=5583900>> 6 pages.

Strom et al., "Medical Image Compression with Lossless Regions of Interest," In Signal Processing, vol. 59, Issue 2, Jun. 1997, retrieved at <<http://www.code.ucsd.edu/cosman/web-09.pdf>> 17 pages.

* cited by examiner

ADAPTIVE SCREEN AND VIDEO CODING SCHEME

BACKGROUND

With the rapid development of computer technologies, screen sharing applications, which were once limited to enterprise applications such as remote desktop control of office computers, have now become available to common users for entertainment and communications, for example. These screen sharing applications usually involve at least two computing devices which necessarily communicate screen data over a data network between the two computing devices. In order to provide real-time interactive screen sharing experience and reduce the amount of data sent over the network, the screen data is usually encoded and compressed prior to sending. Conventional hybrid video coding schemes, such as H.264 and HEVC (High Efficiency Video Coding), which are based on transform domain quantization and entropy coding, have been widely used for this purpose. These hybrid video coding schemes, however, are normally efficient for encoding nature videos, but fail to provide efficient coding and compression results for other types of content such as text content or other high-gradient content which normally constitute a large portion of the screen data. Therefore, unless a coding scheme that can adaptively and efficiently perform coding and compression for a variety of types of content is developed, these screen sharing applications, though implementable, may fail to achieve a screen sharing performance that is satisfactory to most users.

SUMMARY

This summary introduces simplified concepts of adaptive screen and video coding, which are further described below in the Detailed Description. This summary is not intended to identify essential features of the claimed subject matter, nor is it intended for use in limiting the scope of the claimed subject matter.

This application describes example embodiments of adaptive screen and video coding. In one embodiment, a system receives an image, e.g., an image frame of a screen or a video, and partitions the image into a plurality of input blocks. The system examines the input blocks and determines which coding is used for each input block. Examples of coding algorithms include, for example, algorithm a screen coding algorithm (which is specific for encoding and compressing text content and other high-gradient content) or another video coding algorithm. In one embodiment, the system may determine which coding algorithm is used for each input block based on, for example, respective prediction accuracies and/or coding efficiencies that the screen coding algorithm and the video coding algorithm may achieve for each input block. In response to determining which coding algorithm is used for each input block, the system may adaptively apply respective coding algorithms for each input block to complete coding and compression for the image.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

As noted above, existing encoding and compression algorithms fail to adaptively encode and/or compress different types of content (e.g., text, graphics, pictures, videos, etc.) within a single image and/or across multiple images adaptively, and hence fail to provide an efficient coding and compression result for screen sharing applications.

This disclosure describes an adaptive screen and video coding system. The adaptive screen and video coding system receives an image (such as an image frame of a screen or a video) and adaptively selects a coding and compression algorithm for the image or an image portion of the image based on a type of content within the image or the image portion. The selection may be based on, for example, coding/compression performance of the coding and compression algorithm for that image or the image portion. The coding/compression performance may include prediction accuracy, coding/compression efficiency associated with the image or the image portion, for example.

Figure 1:
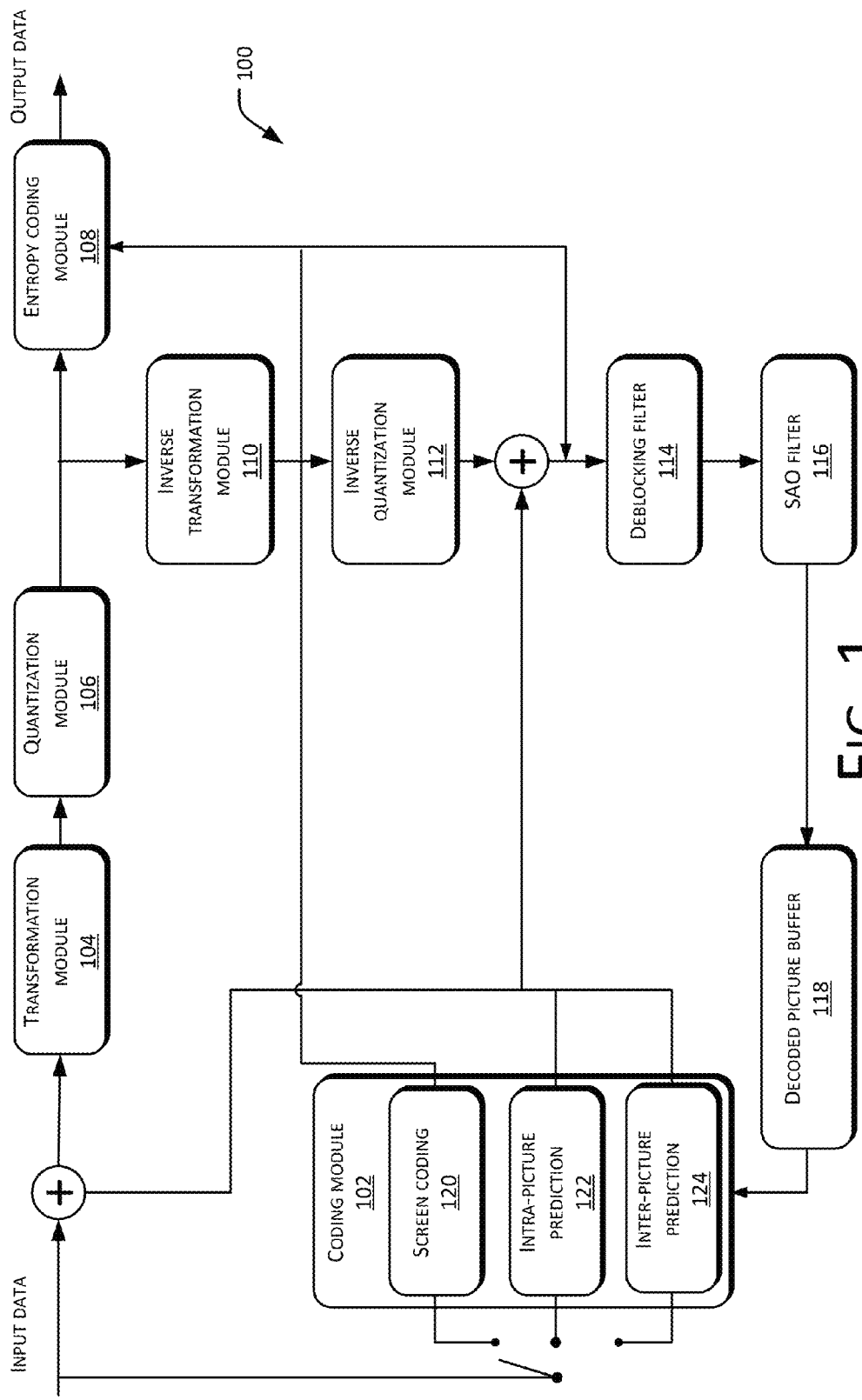
FIG. 1 illustrates an example adaptive screen and video coding framework.

FIG. 1 shows an example adaptive screen and video coding framework 100 that may be used by the adaptive screen and video coding system. Although this example framework 100 is constructed based on a HEVC video coding scheme, the adaptive screen and video coding system is not limited to HEVC, but may also be applicable to other image and/or video coding schemes or standards such as JPEG, JPEG2000, H.261, H.263, H.264, MPEG-1. MPEG-2, MPEG-4, etc. In this example, the framework 100 may include modules such as a coding module 102, a transformation module 104, a quantization module 106, an entropy coding module 108, an inverse transformation module 110, an inverse quantization module 112, a deblocking filter 114, a sample adaptive offset 116 and a decoded picture buffer 118. Details of the transformation module 104, the quantization module 106, the entropy coding module 108, the inverse transformation module 110, the inverse quantization module 112, the deblocking filter 114, the sample adaptive offset (SAO) filter 116 and the decoded picture buffer 118 will be described further below.

In one embodiment, the adaptive screen and video coding system may receive an image. The received image may include an image frame of a screen or a video. Upon receiving the image, the adaptive screen and video coding system may partition or divide the image into a plurality of input blocks. In one embodiment, the adaptive screen and video coding system may determine which coding scheme (e.g., a screen coding scheme 120, an intra-picture prediction scheme 122, an inter-picture prediction scheme 124, etc.) is to be applied for each input block. In some embodiments, the adaptive screen and video coding system may determine which coding scheme to be applied for each input block based on respective prediction accuracies and/or coding efficiencies of the coding schemes. Additionally or alternatively, the adaptive screen and video coding system may determine which coding scheme is to be applied for each input block based on which coding scheme has been applied for a respective input block that is located at a same position or within a neighborhood thereof in a previous image (e.g., a previous image frame of the screen or the video, etc.).

In one instance, responsive to determining that the screen coding scheme 120 is used for a particular input block, the adaptive screen and video coding system may perform color classification. In one embodiment, the adaptive screen and video coding system may compute a distribution of pixel values (or intensities), e.g., a histogram, of the input block. After obtaining the distribution of pixel values for the input block, the adaptive screen and video coding system may select one or more pixel values from the distribution as one or more major colors. In one embodiment, the one or more major colors are one or more representative color or pixel values for (all or a majority of) pixels included in the input block. By way of example and not limitation, the one or more major colors may include, for example, a pixel value having frequency corresponding to one of first N highest frequencies within the distribution of pixel values (where N is a positive integer), a pixel value having frequency greater than or equal to a predetermined frequency threshold, and/or pixel values of having a total frequency greater than or equal to a predetermined total frequency threshold, etc. In some embodiments, the adaptive screen and video coding system may treat pixel values other than one or more major colors as escape pixels. The escape pixels correspond to pixel values that appear in the input block less frequently, for example, as compared to the one or more major colors.

In one embodiment, the adaptive screen and video coding system may assign a unique index value to each major color. Additionally or alternatively, the adaptive screen and video coding system may assign one or more unique index values to the escape pixels. Upon selecting the one or more major colors for the input block, the adaptive screen and video coding system classifies or categorizes each pixel within the input block into a major color or an escape pixel based on its pixel value, and converts each pixel of the input block into a respective index value based on which major color or escape pixel the pixel is classified as.

In some embodiments, after converting pixel values of the pixels of the input block into respective index values (or an index value map), the adaptive screen and video coding system may perform prediction and coding. By way of example and not limitation, the adaptive screen and video coding system may apply a compression algorithm to compress and code the index value map of that particular input block. In one embodiment, the compression algorithm may include a plurality of modes and context models that facilitate prediction of a current pixel or pixel line based on a previous pixel or pixel line, and hence represents the current pixel or pixel line using a short code based on the previous pixel or pixel line.

Upon coding the input block, the adaptive screen and video coding system may perform operations such as quantization, transformation and entropy coding for encoding operations using the other modules of the adaptive screen and video coding framework as described in the foregoing embodiments, and sending an encoding result to a client device for decoding and/or display. The encoding result may include, for example, information of index values representing the major colors and escape pixels, codes obtained for each input block, etc., to a client device for decoding and/or display.

The described system adaptively or selectively determines a coding algorithm for an input block of an image, and applies the determined coding algorithm to classify, predict and code pixels of the input block, thus improving accuracy and efficiency of coding different types of content (such as text, graphic, etc.) included in the image.

In the examples described herein, the adaptive screen and video coding system determines a coding algorithm for an input block, classifies pixels within the input block into major colors and escape pixels, converts pixels values into index values, and predicts and codes the index values. However, in other embodiments, these functions may be performed by one or more services located at a same location or different locations. For example, in at least one embodiment, a determination service may determine a coding algorithm for an input block, while a classification service may classify pixels within the input block into major colors and escape pixels. A conversion service may convert pixels values into index values, and a coding service may predict and code the index values.

Furthermore, although in the examples described herein, the adaptive screen and video coding system may be implemented as software and/or hardware installed in a single device or as a service, in other embodiments, the adaptive screen and video coding system may be implemented in a plurality of devices and/or services provided in one or more servers over a network and/or distributed in a cloud computing architecture.

The application describes multiple and varied implementations and embodiments. The following section describes an example framework that is suitable for practicing various implementations. Next, the application describes example systems, devices, and processes for implementing an adaptive screen and video coding system.

Example Environment

Figure 2:
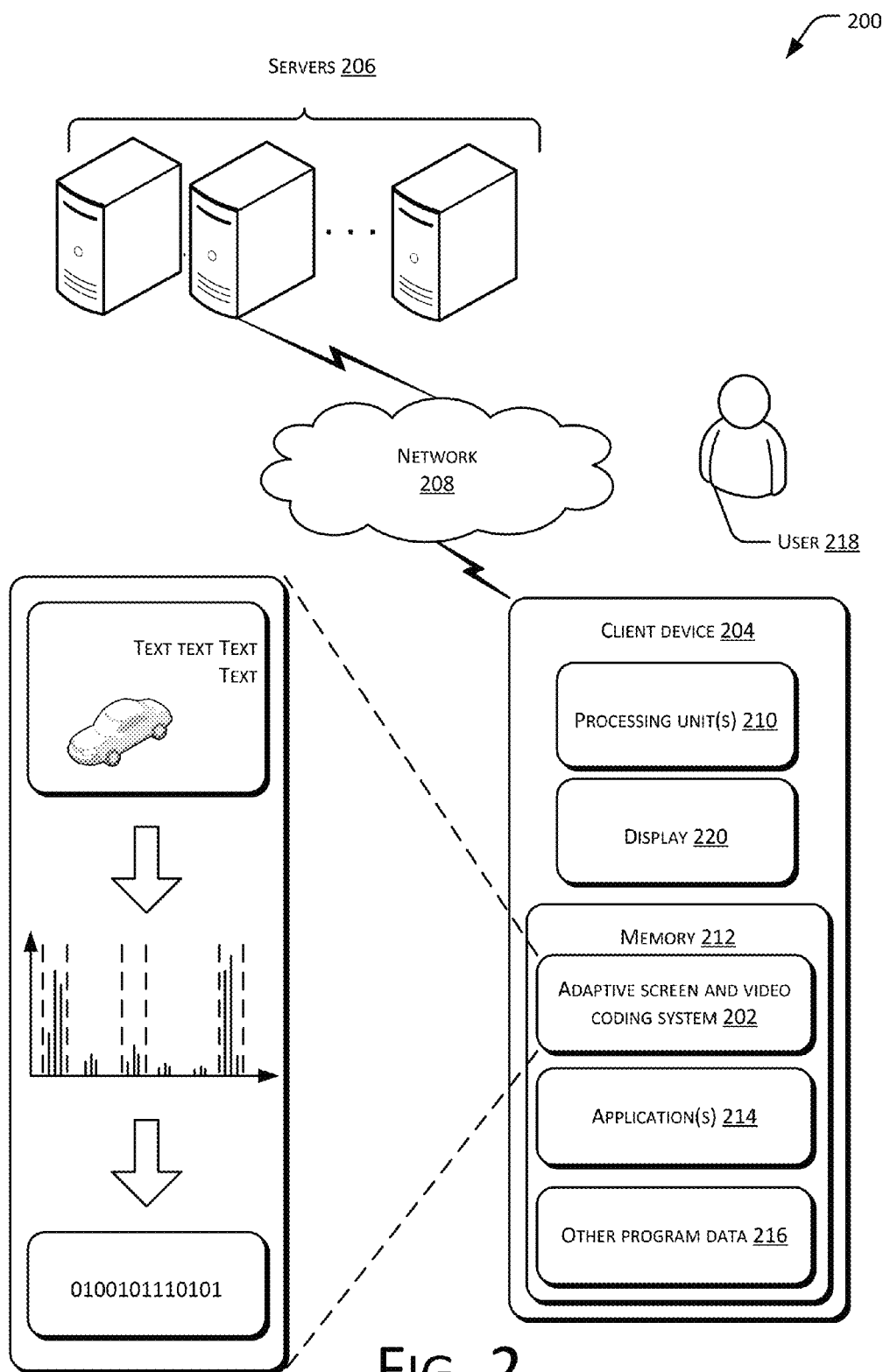
FIG. 2 illustrates an example environment of an adaptive screen and video coding system.

FIG. 2 illustrates an example environment 200 usable to implement an adaptive screen and video coding system 202. In this example, the adaptive screen and video coding system 202 is described as included in a client device 204. However, in other instances, the adaptive screen and video coding system 202 may be an entity independent or separate from the client device 204. In some embodiments, the adaptive screen and video coding system 202 may be a peripheral device of the client device 204. In some instances, the adaptive screen and video coding system 202 may be included in and/or distributed among one or more server(s) 206, which communicate data with the client device 204 via a network 208. Additionally or alternatively, in some embodiments, the functions of the adaptive screen and video coding system 202 may be included in and/or distributed among the client device 204 and one or more servers 206. For example, the one or more servers 206 may include part of the functions of the adaptive screen and video coding system 202 while other functions of the adaptive screen and video coding system 202 may be included in the client device 204. Furthermore, in some embodiments, some or all the functions of the adaptive screen and video coding system 202 may be included in a cloud computing system or architecture.

The client device 204 may be implemented as any of a variety of electronic and/or computing devices that include, are associated with, or are connected to a display or screen. By way of example and not limitation, the client device 204 may be implemented as any of a variety of computing devices including, but not limited to, a mainframe computer, a notebook or portable computer, a handheld device, a netbook, an Internet appliance, a tablet or slate computer, a mobile device (e.g., a mobile phone, a personal digital assistant, a smart phone, etc.), a game console, a set-top box, a video player, etc., or a combination thereof.

The network 208 may be a wireless or a wired network, or a combination thereof. The network 208 may be a collection of individual networks interconnected with each other and functioning as a single large network (e.g., the Internet or an intranet). Examples of such individual networks include, but are not limited to, telephone networks, cable networks, Local Area Networks (LANs), Wide Area Networks (WANs), and Metropolitan Area Networks (MANs). Further, the individual networks may be wireless or wired networks, or a combination thereof. Wired networks may include an electrical carrier connection (such a communication cable, etc.) and/or an optical carrier or connection (such as an optical fiber connection, etc.). Wireless networks may include, for example, a WiFi network, other radio frequency networks (e.g., Bluetooth®, Zigbee, etc.), etc.

In one embodiment, the client device 204 may include one or more processing units 210 coupled to memory 212. The one or more processing unit(s) 210 may be implemented as one or more hardware processors including, for example, a microprocessor, an application-specific instruction-set processor, a graphics processing unit, a physics processing unit (PPU), a central processing unit (CPU), a graphics processing unit (GPU), a digital signal processor, etc. Additionally or alternatively, the functionality described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc.

The memory 212 may include or store one or more applications 214 (e.g., a screen sharing application, a video player application, etc.) that are executed by the one or more processing unit(s) 210, and other program data 216. The memory 212 may be coupled to, associated with, and/or accessible to other devices, such as network servers, routers, and/or the other servers 206.

The memory 212 may include volatile memory, such as Random Access Memory (RAM) and/or non-volatile memory, such as read only memory (ROM) or flash RAM. The memory 212 is an example of computer-readable media. Computer-readable media includes at least two types of computer-readable media, namely computer storage media and communications media.

Computer storage media includes volatile and non-volatile, removable and non-removable media implemented in any method or technology for storage of information such as computer readable instructions, data structures, program modules, or other data. Computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device.

In contrast, communication media may embody computer-readable instructions, data structures, program modules, or other data in a modulated data signal, such as a carrier wave, or other transmission mechanism. As defined herein, computer storage media does not include communication media.

A user 218 may use the application 214 (such as the screen sharing application, etc.) of the client device 204 to remotely connect to another computing device via the network 208. The user 218 may want to transmit or share screen data that is presented in a display 220 of the client device 204 to the other computing device via the network 208. The screen data may include a variety of content including, for example, text content, graphic content, video content, image content, etc. The application 214 may perform this transmission or sharing of the screen data in an accurate and efficient manner using the adaptive screen and video coding system 202.

Example Adaptive Screen and Video Coding System

Figure 3:
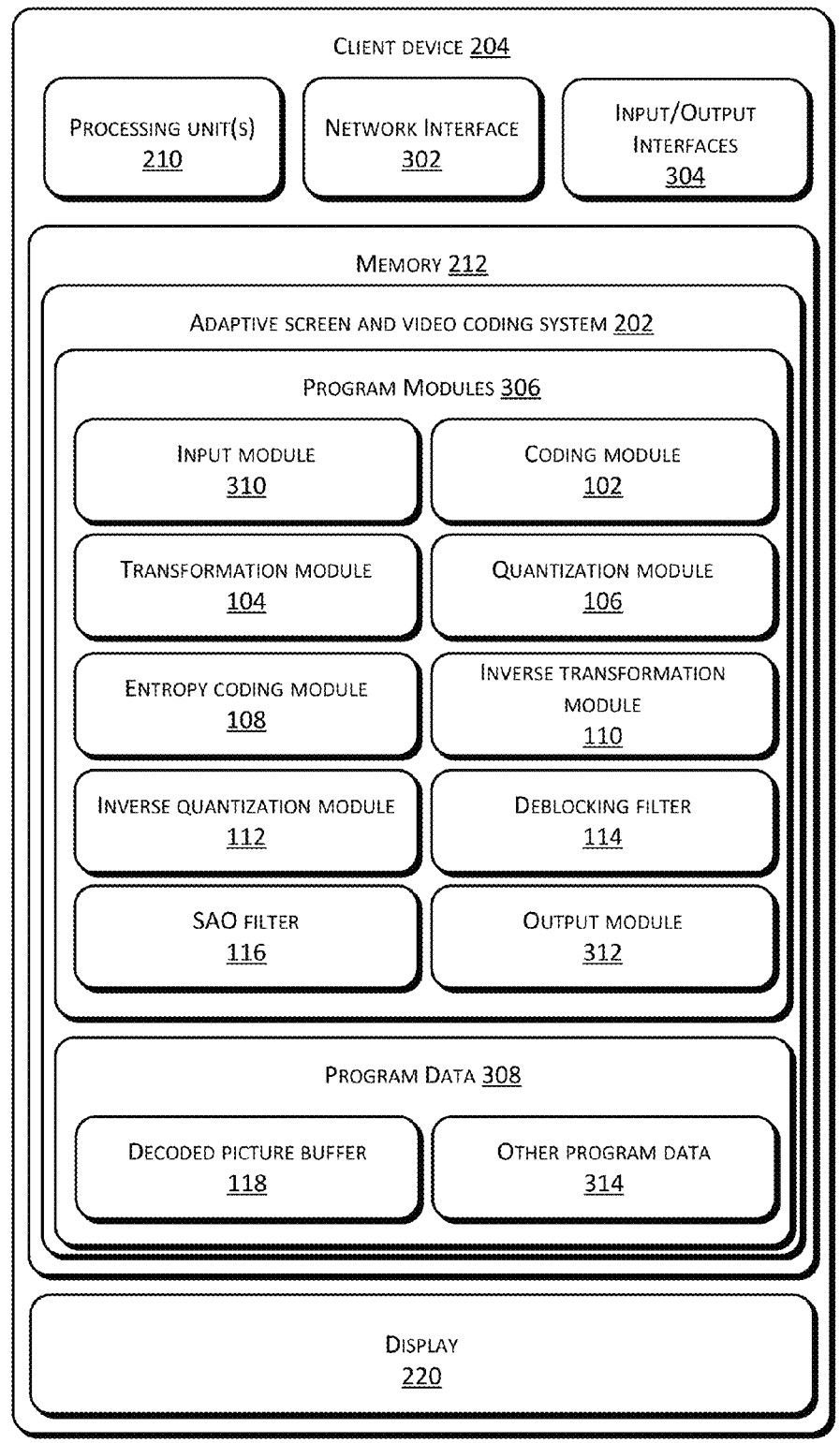
FIG. 3 illustrates the example adaptive screen and video coding system as shown in FIG. 2.

FIG. 3 illustrates an example adaptive screen and video coding system 202 in more detail. In this example, the example adaptive screen and video coding system 202 is described to be included in or part of a client device 204. As described in the foregoing, the client device 204 may include, but is not limited to, one or more processing units 210 and memory 212. Additionally, the client device 204 may further include one or more applications 214. In some embodiments, the client device 204 may further include a network interface 302 and an input/output interface 204. The one or more processing units 210 are configured to execute instructions received from the network interface 302, received from the input/output interface 304, and/or stored in the memory 212. In one embodiment, the client device 204 further includes a display 220. The display 220 may include a touch screen, a normal screen (i.e., a screen without touch-sensitive capability), etc.

The adaptive screen and video coding system 202 may include program modules 306 and program data 308. In one embodiment, the adaptive screen and video coding system 202 may include an input module 310 and a coding module 102. In some embodiments, the adaptive screen and video coding system 202 may additionally include a transformation module 104, a quantization module 106 and an entropy coding module 108 for encoding operations. Additionally, in one embodiment, the adaptive screen and video coding system 202 may further include an inverse transformation module 110, an inverse quantization module 112, a deblocking filter 114, a sample adaptive offset (SAO) filter 116 and a decoded picture buffer 118 for decoding operations. Additionally, the adaptive screen and video coding system 202 may further include an output module 312 and other program data 314.

In one embodiment, the input module 310 is configured to receive input data. The input module 310 may receive this input data from the application 214 (e.g., a screen sharing application) and/or the display 220 (e.g., a touch screen display), etc. The image data may include one or more types of content including, but not limited to, text, graphics, a picture, an image frame of a video, etc. In response to receiving the input data, the input module 310 may partition or divide the input data into a plurality of input blocks (or coding units in HEVC, for example).

Upon partitioning or dividing the input data, the coding module 102 of the adaptive screen and video coding system 202 may compress and/or code the plurality of input blocks.

In one embodiment, the coding module 102 may include a plurality of coding schemes for different types of content. By way of example and not limitation, the plurality of coding schemes may include a screen coding scheme, an intra-picture prediction coding scheme, an inter-picture prediction coding scheme, etc. In one embodiment, the coding module 102 may determine which coding scheme is used for an input block based on, for example, respective accuracies and/or coding efficiencies of the plurality of coding schemes for that input block. For example, the coding module 102 may code the input block into a plurality of codes using the plurality of coding schemes and select a coding scheme that produces a code having the highest accuracy and/or the highest compression rate among the plurality of coding schemes.

Additionally or alternatively, the coding module 102 may determine or select which coding scheme is to be used for an input block based on a type of content that is included in the input block. By way of example and not limitation, the coding module 102 may select the screen coding scheme in response to determining that at least a predetermined amount or percentage (e.g., 60%, 70%, 80%, 95%, etc.) of content in the input block corresponds to text content and/or other high-gradient content, and select a video coding scheme such as the intra-picture prediction coding scheme. Otherwise, the coding module 102 may select the inter-picture prediction coding scheme.

Additionally or alternatively, the coding module 102 may determine or select a coding scheme for coding a current input block based on which coding scheme(s) has/have been selected for coding one or more other input blocks that are adjacent and/or previous to the current input block within a same frame and/or a previous frame of the input data. For example, the coding module 102 may select a coding scheme for a current input block if the coding scheme is used for a majority of input blocks that are within a neighborhood (e.g., currently adjacent to the current input block, etc.) of the current input block within a same frame and/or a previous frame of the input data. In some embodiments, the coding module 102 may perform one or more other strategies (such as strategies that are based on accuracy, efficiency, type of content, etc.) as described above if the majority of input blocks fails to reach a number or percentage (e.g., 30% or above) predetermined by the user 218 and/or the adaptive screen and video coding system 202.

Upon determining or selecting a coding scheme for coding an input block, the coding module 102 may perform an associated coding based on the determined or selected coding scheme. In some embodiments, the coding module 102 may determine or select a video coding scheme such as the intra-picture prediction coding scheme or the inter-picture prediction coding scheme, and perform coding based on intra-picture prediction or inter-picture prediction.

In one embodiment, if the screen coding scheme is selected for a current input block, the coding module 102 may perform color classification (or pixel classification), and prediction/coding according to the screen coding scheme. In one embodiment, the coding module 102 may compute a distribution of pixel values (or intensities) within the current input block. For example, the coding module 102 may compute or count frequencies of appearance or existence of different pixel values within the current input block.

In response to obtaining the distribution of pixel values within the current input block, the coding module 102 may classify pixels of the current input block into different pixel classes. By way of example and not limitation, the coding module 102 may classify the pixels into one or more major colors (or major pixel colors or values) and one or more escape pixels. In one embodiment, the coding module 102 may classify the pixels with respect to each color component. For example, a color value or intensity of a pixel may be represented in three different color components (such as green, red, blue, etc.), and the coding module 102 may classify each color component of the pixel into a major color or an escape pixel for that color component. In this first scenario, the coding module 102 may determine one or more major colors and one or more escape pixels for each color component. In some embodiments, the coding module 102 may classify the pixels based on respective overall color or pixel values in a color model (such as a RGB (Red, Green and Blue) color model, a CMYK (Cyan, Magenta and Yellow) color model, a YUV (i.e., one luma component Y, and two chrominance components U and V) color model, etc.). In this second scenario, the coding module 102 may determine one or more major colors and one or more escape pixels for overall color or pixel values instead of individual color components. The description or section hereinafter applies to one or both of these scenarios for major colors and escape pixels.

In one embodiment, the one or more major colors may include one or more most representative pixel values that cover a majority of pixels within the current input block. Additionally or alternatively, the one or more major colors may include, for example, a pixel value having frequency corresponding to one of the N highest frequencies within the distribution of pixel values (where N is a positive integer), a pixel value having frequency greater than or equal to a predetermined frequency threshold, and/or pixel values having a total frequency greater than or equal to a predetermined total frequency threshold, etc. In some embodiments, the one or more escape pixels correspond to pixel values that are not included in the one or more major colors.

Additionally or alternatively, the coding module 102 may partition or divide the pixel values of the current input block into one or more clusters or sections based on a clustering algorithm (such as K-means clustering, density-based clustering, etc.) or based on an even division or partitioning of pixel value range. In one embodiment, the coding module 102 may select a pixel value having the highest frequency of appearance in each cluster or section as the one or more major colors. In some instances, the coding module 102 may select a pixel value having the highest frequency of appearance in each cluster or section as the one or more major colors (only) if the frequency of that pixel value is greater than or equal to a predetermined frequency threshold, e.g., five, ten, fifteen, etc.

In some embodiments, the coding module 102 may create a quantization zone for a major color. The quantization zone may include or correspond to a range of pixel values around or in a neighborhood of the major color, e.g., a range including m±q, where m corresponds to a pixel value of the major color and q corresponds to a quantization value, e.g., one, two, five, ten, etc. For example, for lossy coding, the coding module 102 may quantize pixel values that are within a predetermined neighborhood of a major color to the value of the major color. The coding module 102 may set pixel values that do not belong to the one or more major colors as escape pixels, which may also be quantized prior to coding. In some examples, such as lossless coding, the coding module 102 may not employ quantization.

In some embodiments, the coding module 102 may further allow a major color to cover or represent a single pixel value or a range of pixel values. In one embodiment, the coding module 102 may allow one major color to cover or represent a single pixel value and another major color to cover or represent a range of pixel values. By way of example and not limitation, the coding module 102 may allow a selected major color to cover or represent pixel values of a same cluster or section thereof. In some instances, the coding module 102 may determine whether a major color covers or represents a single pixel value or a range of pixel values based on a pixel density about the major color (e.g., a number of pixels having pixel values within a predetermined neighborhood of the major color) as determined from the distribution of pixel values obtained in the foregoing embodiments. For example, if the pixel density about a major color is greater than or equal to a predetermined density threshold (e.g., two, five, ten, etc.), the coding module 102 may employ the major color to cover or represent pixel values within a predetermined neighborhood (±2 pixel values in a pixel value range of 256, for example) of the major color. Otherwise, the coding module 102 may employ the major color to cover or represent a single pixel value to which the major color corresponds. Alternatively, in some embodiments, the coding module 102 may perform quantization for pixel values and employ each major color to cover or represent a range of pixel values within a respective predetermined quantization zone.

In this example, the adaptive screen and video coding system 202 is described to determine or select one or more major colors for each input block, and hence the one or more major colors may be different or varied from one input block to another input block within a same image or input data. In some embodiments, the adaptive screen and video coding system 202 may determine one or more major colors for an entire image or input data, and employ these major colors for the entire image or input data. This may further save or reduce the amount of data transmitted by sending information of the major colors once for all input blocks of the image or input data instead of sending information of respective major colors for different input blocks of the image or input data.

Figure 4:
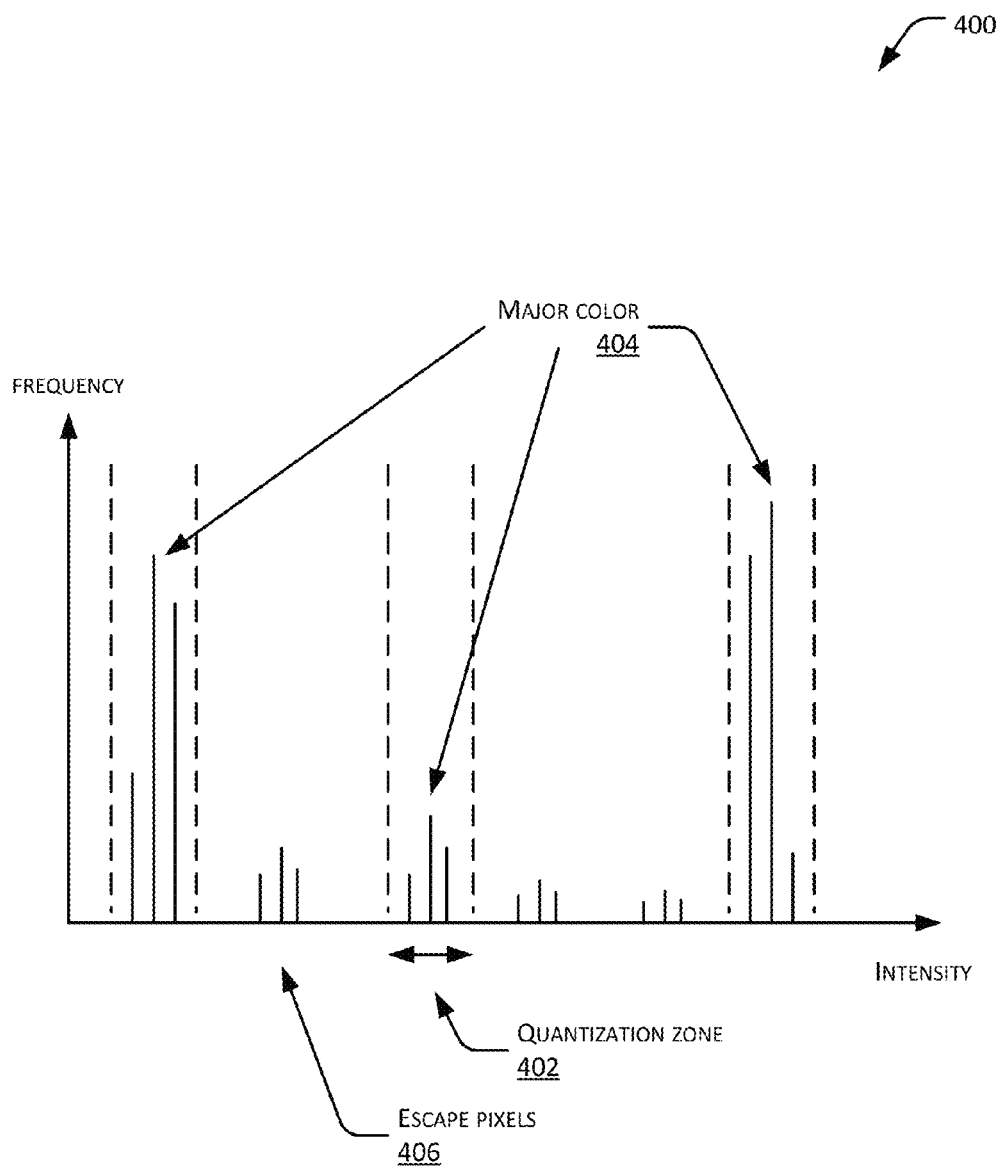
FIG. 4 illustrates an example graphical representation of color classification.

FIG. 4 illustrates an example classification result 400 obtained by color classification of the screen coding scheme. The classification result 400 in this example is represented as a histogram of pixel values which ranges from zero to two hundred and fifty-five. Depending on a color model or system, such as a RGB (Red, Green and Blue) color model, a CMYK (Cyan, Magenta and Yellow) color model, a YUV (i.e., one luma component Y, and two chrominance components U and V) color model, etc., that may be used, the range of pixel values may be varied from one model to another model. In this example, the coding module 102 selects a pixel value having the highest frequency within a cluster or a quantization zone 402 thereof as a major color 404. The coding module 102 may then treat pixel values that are outside the clusters or quantization zones 402 as escape pixels 406.

In response to determining the one or more major colors, the coding module 102 may assign color index values to the one or more major colors and the one or more escape pixels. Since not every pixel value within a pixel value range appears in the current input block, representing the major colors and escape pixels as color index values reduces the amount of data used to code information of the current input block. In one embodiment, the coding module 102 may include or select a same set of index for each color component of a color model (such as a RGB color model, a CMYK (color model, a YUV color model, etc.) for consistency and/or easy of indexing. In some embodiments, the coding module 102 may include or select a different set of index for each color component of a color model. For example, the distribution of pixel values for each color component of the color model may be different. The coding module 102 may therefore select or determine a different set of index for each color component of the color model.

In one embodiment, the coding module 102 may represent a color index value of a pixel as a combination of a color index value of each color component of the pixel. For example, the coding module 102 may represent a color index value as a single joint or concatenated index value of color components, e.g., RGB. By way of example and not limitation, the coding module 102 may generate a joint or concatenated index value using the following formula:

$$\text{index}_R \ll 2*\text{bits}_{index} + \text{index}_G \ll 2*\text{bits}_{index} + \text{index}_B = \text{index}_{joint} \qquad (1)$$

where $\text{index}_R$, $\text{index}_G$ and $\text{index}_B$ are color index values of red, green and blue for a same pixel, and $\text{index}_{joint}$ corresponds to a joint or concatenated index value for that same pixel.

In some embodiments, for a YUV color model or format, the coding module 102 may perform joint index value coding based on 4:4:4 sampling, with joint index value coding used only for U and V chrominance components for 4:2:0 and 4:2:2 sampling. In one embodiment, the coding module 102 may alternatively represent a color index value of each color component of a pixel individually or independently without combining or concatenating the color index value of each color component of the pixel into a single index value (such as a joint index value as described above).

In one embodiment, the coding module 102 may classify the pixels of the current input block into a major color or an escape pixel. Depending on which definition of a major color is used, the coding module 102 may classify the pixels of the current input block into a major color or an escape pixel based on respective pixel values accordingly. In one embodiment, after classifying the pixels of the current input block, the coding module 102 may convert the pixel values of the current input block into corresponding color index values (such as joint index values) that represent the major colors and the escape pixels respectively to form an index value map. In some instances, when the coding module 102 represents a color index value of each color component of a pixel individually or independently, the coding module 102 may convert pixel values in each color component to form a separate index value map associated with that color component for the pixels. Additionally, the coding module 102 may include information of these color index values that represent the major colors and the escape pixels in a final code of the current input block so that a receiver of the code may determine which pixel values these color index values represent.

Figure 5:
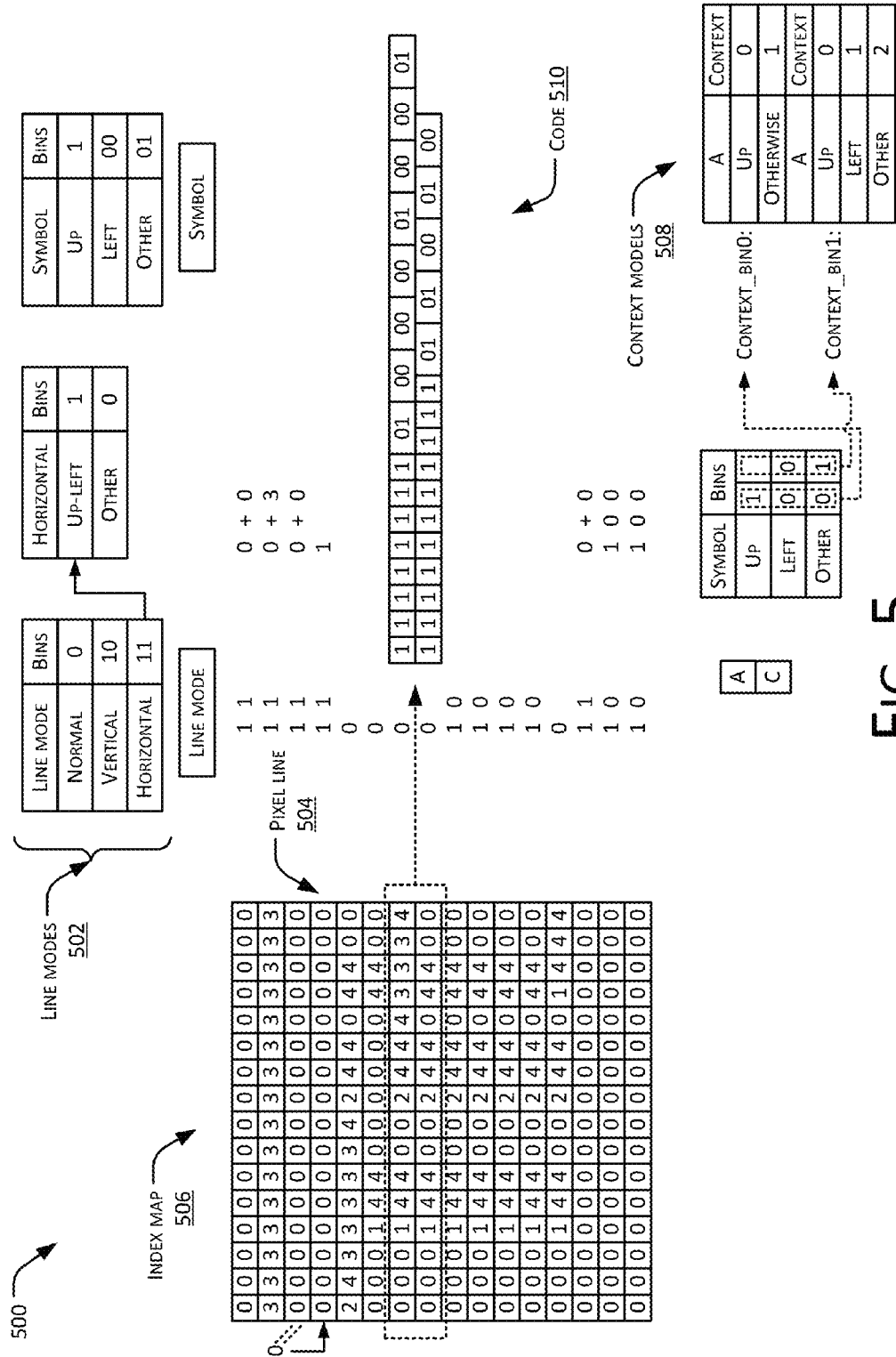
FIG. 5 illustrates an example line-based prediction method.

In one embodiment, after classifying the pixels and converting the pixel values into the color index values to form an index value map of the current input block (or an index value map of each color component), the coding module 102 may exploit or determine correlations among the pixels of the current input block for compressing and coding pixel information of the current input block. After forming the index value map of the current input block, the coding module 102 may employ a prediction algorithm to exploit or determine the correlations among the pixels of the current input block. In one embodiment, the coding module 102 may employ a line-based prediction method or a block-based prediction method. The line-based prediction method or algorithm predicts a current pixel line (i.e., a current sequence of pixel values along a horizontal line of an input block) based on another pixel line and/or one or more pixel values that are related or adjacent to the current pixel line. FIG. 5 illustrates a graphical representation 500 of the line-based prediction method. In one embodiment, the line-based prediction method may include a plurality of prediction or line modes 502 used to signal a prediction approach for a current pixel line 504 of an index value map 506 associated with a current input block. Examples of the plurality of prediction or line modes 502 may include a horizontal mode, a vertical mode and a normal mode.

By way of example and not limitation, the horizontal mode may represent that each pixel along a same pixel line has a same pixel value. In one embodiment, if this pixel value is the same as a first pixel of a pixel line that is previous to or above of the current pixel line, the coding module 102 may represent or code this current pixel line using data (such as mode bits) representing the horizontal mode without coding information about the pixel value. In some embodiments, if this pixel value is different from a first pixel of a pixel line that is previous to or above of the current pixel line, the coding module 102 may represent or code this current pixel line using the data representing the horizontal mode and additional data representing the pixel value of the current pixel line.

Additionally, the vertical mode may represent that a current pixel line is the same as a pixel line that is immediately prior to or above the current pixel line. In this instance, the coding module 102 may represent or code this current pixel line using data representing the vertical mode without including information of pixel values of the current pixel line as this information has been represented or coded previously, for example, for the above pixel line. In some embodiments, the normal mode may represent that pixels in a current pixel line are predicted individually. For example, the coding module 102 may employ one or more neighbors (e.g., immediate neighbors) of a current pixel of the current pixel line as a predictor and code a prediction direction for the current pixel based on the one or more neighbors.

In one embodiment, the coding module 102 may employ a fixed length code or a variable length code to represent a prediction mode for a pixel line. By way of example and not limitation, the coding module 102 may employ one data unit or bin (such as one data bit, one data byte, etc., depending on a smallest data unit employed by the client device 204 or the adaptive screen and video coding system 202, for example) to indicate whether the normal mode is used, and an additional one data unit to indicate whether the horizontal mode or the vertical mode is used. Additionally, the coding module 102 may employ one or more data units, e.g., two data units, to indicate a prediction direction for a pixel in the normal mode.

In some embodiments, in order to further improve coding and compression performance, the line-based prediction method may further include one or more context models 508. The line-based prediction method uses the context models to represent relationship(s) between a current pixel and its one or more neighbors, e.g., correlation between a pixel value of the current pixel and pixel values of its neighbors. By way of example and not limitation, the line-based prediction method may include two context models for a first data unit of the prediction mode and three context models for a second data unit of the prediction mode. FIG. 5 also shows an example code 510 for the index value map 506 based on the described line-based prediction method.

Due to a high-pixel dependency of the line-based prediction method, in some embodiments, the coding module 102 may alternatively employ the block-based prediction method for performing predictive coding of the current input block. The algorithm for the block-based prediction method is similar to that of the line-based prediction method, except that a pixel sub-block (such as a 4×4 block, a 8×8 block, etc.) is used instead of a pixel line within a current input block and no pixel prediction dependency is allowed or employed within the pixel sub-block.

In order to increase the flexibility and further improve the performance of the line-based method, in some embodiments, a pixel line may vary in length. For example, the coding module 102 may divide a current pixel line within the current input block into a plurality of pixel sub-lines, and separately or individually determine which line mode is to be used for a pixel sub-line of the current pixel line. In other words, the coding module 102 may determine that more than one line mode, e.g., the horizontal mode and the vertical mode, may be used for the current pixel line pixel line, a line mode for a pixel sub-line and another line mode for another pixel sub-line of the same pixel line, for example. For example, the coding module 102 may signal or select the vertical mode for a portion of a current pixel line (i.e., a pixel sub-line) that includes one or more consecutive pixels in the current pixel line if the one or more consecutive pixels are the same with their respective neighbors above. Additionally or alternatively, the coding module 102 may signal or select the horizontal mode for a portion of a current pixel line (i.e., a pixel sub-line) that includes one or more consecutive pixels in the current pixel line if the one or more consecutive pixels have the same index values (or pixel values). In one embodiment, the coding module 102 may record and transmit associated number of consecutive pixels or run length (i.e., a length of that portion of the current pixel line) for the vertical mode to the transformation module 314 for subsequent operations or the output module 330 for sending. Additionally, for the horizontal mode, the coding module 102 may record and transmit a corresponding index value (or pixel value) and the number of consecutive pixels (i.e., a length of that portion of the current pixel line under the horizontal mode) involved in the horizontal mode to the transformation module 314 for subsequent operations or the output module 330 for sending.

In some embodiments, upon completing the predictive coding of the current input block (e.g., based on the screen coding scheme or the video coding scheme such the intra-picture or inter-picture prediction algorithm), the transformation module 314 may compute and transform a residual between the current input block and a prediction result of the current input block as determined based on the predictive coding to obtain a set of transform coefficients using, for example, a linear transform such as Discrete Cosine Transform (DCT), etc. The quantization module 316 may quantize the transform coefficients which are then entropy coded by the entropy coding module 324. The output module 330 may then send information of color index values representing the major colors and the escape pixels, the code obtained in the predictive coding and the transform coefficients which have been entropy coded to the application 214 or another client device for decoding or display in the other client device.

In some embodiments, the inverse transformation module 110 may construct the quantized transform coefficients to obtain an approximation of the residual, for example, using inverse DCT. The adaptive screen and video coding system 202 may add the approximated residual to the prediction result to obtain a summation result. The adaptive screen and video coding system 202 may smooth out artifacts induced by block-wise processing and quantization using the inverse quantization module 112, the deblocking filter 114 and the sample adaptive offset (SAO) filter 116 to obtain a picture representation of the input data (i.e., the plurality of input blocks). The adaptive screen and video coding system 202 may store the picture representation(s) of the input data in the decoded picture buffer 118 to be used for prediction of subsequent input data. Additionally or alternatively, the adaptive screen and video coding system 202 may employ these modules, i.e., the inverse transformation module 110, the inverse quantization module 112, the deblocking filter 114, the sample adaptive offset (SAO) filter 116 and the decoded picture buffer 118 for decoding operations.

Example Syntax Element Changes

As described in the foregoing embodiments, the adaptive screen and video coding system 202 employs a new coding scheme which may lead to syntax changes as well as decoding process in an existing video coding scheme or standard. Using HEVC coding scheme as an example, Table 1 shows syntax elements that may be added to PPS (sequence parameter set) and coding unit (CU), with italic and bold characters representing new or added syntax elements. In this example, a new flag representing whether the screen coding is enabled or disabled, one or more criteria for determining whether the screen coding is used for a coding unit (or an input block), and program codes for determining the one or more major colors and escape pixels, etc., are shown in Table 1.

TABLE 1

Example Syntax Element Changes for HEVC

| | Descriptor |
|---|---|
| seq_parameter_set_rbsp( ){ | |
| ... | |
|     transform_skip_context_enabled_flag | u(1) |
|     intra_block_copy_enabled_flag | u(1) |
|     *intra_screen_coding_enabled_flag* | u(1) |
| ... | |
| coding_unit( x0, y0, log2CbSize ){ | |
| ... | |
|   else { | |
|     if( intra_block_copy_enabled_flag ) | |
|       intra_bc_flag [ x0 ][ y0 ] | ae(v) |
|     if( !intra_bc_flag[ x0 ][ y0 ] ){ | |
|       *if( screen_coding_enabled_flag )* | |
|         *intra_scm_flag[ x0 ][ y0 ]* | ae(v) |
|       *if( intra_scm_flag[ x0 ][ y0 ] ) {* | |
|         *color_index_coding(x0, y0, nCbS, nCbS)* | |
|     *} else {* | |
|       if( slice_type != I ) | |
|         pred_mode_flag | ae(v) |
|       if( CuPredMode[ x0 ][ y0 ] != | |
|       MODE_INTRA \|\| | |
|         log2CbSize = = MinCbLog2SizeY ) | |
|         part_mode | ae(v) |
|     } | |
|     if( CuPredMode[ x0 ][ y0 ] = = | |
|     MODE_INTRA ){ | |
|       if( PartMode = = PART_2Nx2N && | |
|       pcm_enabled_flag && | |
| !intra_bc_flag | |
|         *&& !intra_scm_flag &&* | |
|         log2CbSize >= Log2MinIpcmCbSizeY | |
|         && | |
|         log2CbSize <= Log2MaxIpcmCbSizeY ) | |
|         pcm_flag[ x0 ][ y0 ] | ae(v) |
|     ... | |
|     *if( !pcm_flag[ x0 ][ y0 ] &&* | |
|     *!intra_scm_flag[ x0 ][ y0 ] ) {* | |
|       if( CuPredMode[ x0 ][ y0 ] != | |
|       MODE_INTRA && | |
|         !( PartMode = = PART_2Nx2N && | |
|         merge_flag[ x0 ][ y0 ] ) \|\| | |

TABLE 1-continued

Example Syntax Element Changes for HEVC

| | Descriptor |
|---|---|
|       CuPredMode[ x0 ][ y0 ] = = | |
|       MODE_INTRA && | |
| intra_bc_flag[ x0 ][ y0 ] ) | |
|         rqt_root_cbf | ae(v) |
| ... | |
|     } | |
|     } | |
|   } | |
| } | |
| *color_index_coding(x0, y0, CbWidth, CbHeight) {* | |
| *for(cldx = 0; cldx <* | |
| *( ChromaArrayType == 0 )?1:3; cldx++) {* | |
|   *major_color_num[ x0 ][ y0 ][ cldx ]* | ae(v) |
|   *for( n = 0; n < major_color_num[ cldx ]; n++ ) {* | |
|     *major_color_pred_flag[ x0 ][ y0 ][ cldx ][ n ]* | ae(v) |
|     *if( !major_color_pred[ cldx )* | |
|     *major_color_pred_dir[ x0 ][ y0 ][ cldx ][ n ]* | ae(v) |
|   *}* | |
| *}* | |
| *( ChromaArrayType == 0 )?1:3; cldx++) {* | |
| *(ChromaArrayType == 3 )?1:3; n++) {* | |
|   *for( i = 0; i < CbHeight; i ++ ) {* | |
|     *line_mode[ x0 ][ y0 ][ cldx ][i]* | ae(v) |
|     *if( line_mode[ x0 ][ y0 ][ cldx ][ i ] == HOR_MODE ) {* | |
|       *line_index_flag[ x0 ][ y0 ][ cldx ][ i ]* | ae(v) |
|       *if( !line_index_flag[ x0 ][ y0 ][ cldx ][i] ) {* | |
|         *for( cSubldx = 0; cSubldx <* | |
|         *( ChromaArrayType == 3 ) ?3:1; cSubldx++ ) { <* | |
|           *color_index[ x0 ][ y0 ][ cldx + cSubldx ][ i ][ 0 ]* | ae(v) |
|         *}* | |
|       *}* | |
|     *} else if(line_mode[ x0 ][ y0 ][ cldx ][ i ] == VER_MODE) {* | |
|       *for(j = 0; j < Cb Width; j++) {* | |
|         *for( cSubldx = 0; cSubldx <* | |
|         *( ChromaArrayType == 3 ) ?3:1; cSubldx++ ) { <* | |
|           *color_index[ x0 ][ y0 ][ cldx + cSubldx ][ i ][ j ] =* | |
|           *color_index[x0][y0][cldx + cSubldx][i-1][j]* | |
|         *}* | |
|       *}* | |
|     *} else {* | |
|       *for(j = 0; j < Cb Width; j++) {* | |
|         *index_pred_symbol [ x0 ] [ y0 ] [ cldx ] [ i ] [ j ]* | ae(v) |
|       *}* | |
|       *} else {* | |
|       *if(Indx_pred_smbol[ x0 ][ y0 ][ cldx ][ i ][ j ] == NO_PREDICTION) {* | |
|         *for( cSubldx = 0; cSubldx <* | |
|         *( ChromaArrayType == 3 ) ?3:1; cSubldx++ ) { <* | |
|           *color_index[ x0 ][ y0 ][ cldx ][ I ][ j ]* | ae(v) |
|         *}* | |
|       *}* | |
|     *}* | |
|     *for(j = 0; j < Cb Width; j++) {* | |
|       *for(cSubldx = 0; cSubldx <* | |
|       *( ChromaArrayType == 3 ) ?3:1; cSubldx++ ) { <* | |
|         *if(color_index[ x0 ][ y0 ][ cldx + cSubldx ][i][0]* | |
|         *== major_color_num[ x0 ][ y0 ][ cldx + cSubldx ]) {* | |
|         *for(j = 0; j < Cb Width; j++)* | |
|           *quant_escape_value[ cldx + cSubldx ][ i ]{j]* | ae(v) |
|         *}* | |
|       *}* | |
|     *}* | |
|   *}* | |
| *}* | |
| *}* | |

Examples Methods

Figure 6:
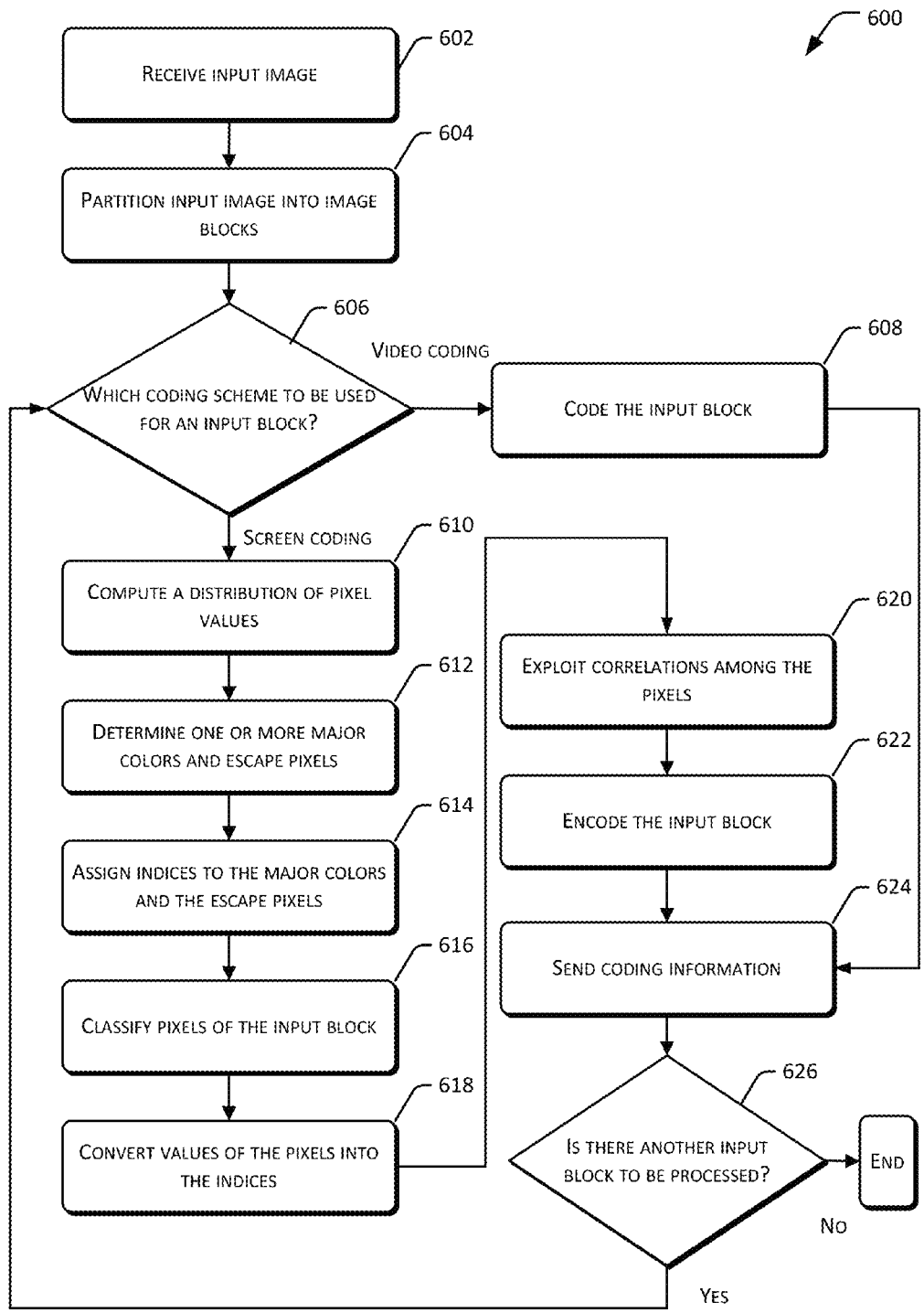
FIG. 6 illustrates an example method of adaptive screen and video coding.
Figure 7:
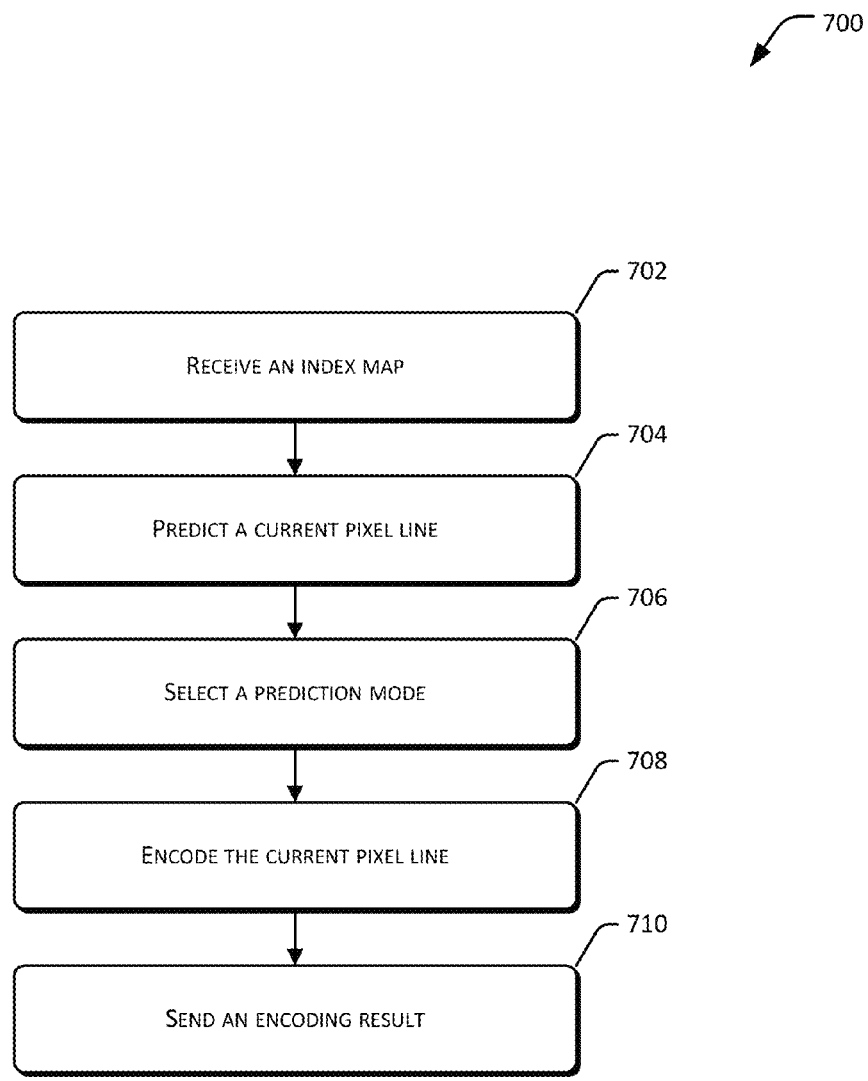
FIG. 7 illustrates an example method of predictive coding.

FIG. 6 is a flow chart depicting an example method 600 of adaptive screen and video coding. FIG. 7 is a flow chart depicting an example method 700 of predictive coding. The methods of FIGS. 6 and 7 may, but need not, be implemented in the framework of FIG. 1 and the environment of FIG. 2, using the device of FIG. 3, and/or employing methods of FIGS. 4 and 5. For ease of explanation, methods 600 and 700 are described with reference to FIGS. 1-5.

However, the methods 600 and 700 may alternatively be implemented in other environments and/or using other systems.

Methods 600 and 700 are described in the general context of computer-executable instructions. Generally, computer-executable instructions can include routines, programs, objects, components, data structures, procedures, modules, functions, and the like that perform particular functions or implement particular abstract data types. The methods can also be practiced in a distributed computing environment where functions are performed by remote processing devices that are linked through a communication network. In a distributed computing environment, computer-executable instructions may be located in local and/or remote computer storage media, including memory storage devices.

The example methods are illustrated as collections of blocks in a logical flow graph representing a sequence of operations that can be implemented in hardware, software, firmware, or a combination thereof. The order in which the method is described is not intended to be construed as a limitation, and any number of the described method blocks can be combined in any order to implement the method, or alternate methods. Additionally, individual blocks may be omitted from the method without departing from the spirit and scope of the subject matter described herein. In the context of software, the blocks represent computer instructions that, when executed by one or more processors, perform the recited operations. In the context of hardware, some or all of the blocks may represent application specific integrated circuits (ASICs) or other physical components that perform the recited operations.

Referring to FIG. 6, at block 602, the input module 310 of the adaptive screen and video coding system 202 receives input data, e.g., an image of a screen or a video.

At block 604, the input module 310 partitions or divides the input data into a plurality of input blocks (e.g., a plurality of image blocks).

At block 606, the coding module 102 of the adaptive screen and video coding system 202 determines which coding scheme is to be used for an input block of the plurality of input blocks. In one embodiment, the coding module 102 may determine a coding scheme to be used for the input block based on a type of content included in the input block. In one embodiment, the coding module 102 may determine that a video coding scheme such as an intra-picture prediction coding scheme or an inter-picture prediction coding scheme is to be used for the input block. In other embodiments, the coding module 102 may determine that a screen coding scheme is to be used for the input block.

At block 608, the coding module 102 converts the input block into a code based on the video coding scheme.

At block 610, the coding module 102 computes a distribution of pixel values associated with the input block.

At block 612, the coding module 102 selects one or more pixel values from the distribution of pixel values as one or more major colors. Additionally, the coding module 102 may treat pixel values that do not belong to the one or more major colors as escape pixels.

At block 614, the coding module 102 assigns one or more first index values to the one or more major colors. Additionally, the coding module 102 may further assign one or more second index values to one or more escape pixels included in the input block.

At block 616, the coding module 102 classifies each pixel of the first image block into a major color of the one or more major colors or an escape pixel of the one or more escape pixels based on a pixel value of each pixel.

At block 618, the coding module 102 converts the pixel value of each pixel into an index value based on which major color or escape pixel that the pixel value is classified.

At block 620, the coding module 102 exploits or determines correlations among the index value of each pixel based on a line-based prediction algorithm. In one embodiment, the line-based prediction algorithm includes at least a horizontal mode, a vertical mode and a normal mode.

At block 622, the coding module 102 encodes the input block into a code according to the line-based prediction algorithm.

At block 624, the output module 312 of the adaptive screen and video coding system 202 sends or streams coding information to a device for decoding and/or display. For example, the output module 312 may send or stream information of the code the one or more first index values, and/or the one or more second index values to a device for decoding and/or display.

At block 626, the input module 310 determines whether another input block or input data exists for processing. If another input block or input data exists, the coding module 102 processes this other input block or input data as described in the above operations.

Referring to FIG. 7, at block 702, the coding module 312 of the adaptive screen and video coding system 202 receives an index value map associated with a plurality of pixel lines of an input block. In one embodiment, the index value map includes a plurality of joint index values for the plurality of pixel lines, where a joint index value of a pixel corresponds to a concatenation of respective index values of color components of the pixel.

At block 704, the coding module 312 predicts a current pixel line of the input block based on a previous pixel line or a previous pixel of the input block.

At block 706, the coding module 312 selects a prediction mode from a plurality of prediction modes based on the prediction. In one embodiment, the plurality of prediction modes includes a horizontal mode, a vertical mode and a normal mode.

At block 708, the coding module 312 encodes the current pixel line based on the selected prediction mode.

At block 710, the output module 312 sends or streams a result of the encoding to a device or application (e.g., the client device 204 or the application 214) for decoding and/or display.

Any of the acts of any of the methods described herein may be implemented at least partially by a processor or other electronic device based on instructions stored on one or more computer-readable media. By way of example and not limitation, any of the acts of any of the methods described herein may be implemented under control of one or more processors configured with executable instructions that may be stored on one or more computer-readable media such as one or more computer storage media. Furthermore, the components and operations of the various embodiments as described in the foregoing may be combined, rearranged, substituted and/or omitted without departing from the present disclosure.

CONCLUSION

Although embodiments have been described in language specific to structural features and/or methodological acts, it is to be understood that the claims are not necessarily limited to the specific features or acts described. Rather, the specific features and acts are disclosed as exemplary forms of implementing the claimed subject matter.

What is claimed is:

1. A method comprising:
under control of a processing unit configured with executable instructions:
partitioning an image into a plurality of image blocks including at least a first image block;
determining a particular coding scheme used by a majority of image blocks in a neighborhood of the first image block in the image and determining whether a number or percentage of the majority of image blocks reaches a predetermined number or percentage, wherein the particular coding scheme is selected if the number or percentage of the majority of image blocks reaches the predetermined number or percentage;
computing one or more of respective accuracies or coding efficiencies of a plurality of coding schemes for the first image block in response to determining that the number or percentage of the majority of image blocks does not reach the predetermined number or percentage;
determining that a screen coding scheme is to be used for the first image block from among the plurality of coding schemes based at least in part on the one or more of the respective accuracies or coding efficiencies of the plurality of coding schemes for the first image block;
selecting one or more pixel values from a distribution of pixel values as one or more major colors, the one or more major colors corresponding to one or more representative pixel values for a plurality of pixels included in the first image block;
assigning one or more first index values to the one or more major colors;
assigning one or more second index values to one or more escape pixels included in the first image block, the one or more escape pixels not belonging to the one or more major colors;
classifying each pixel of the plurality of pixels into a major color of the one or more major colors or an escape pixel of the one or more escape pixels based on a pixel value of each pixel;
converting the pixel value of each pixel into an index value based on which major color or escape pixel the pixel value is classified as;
determining correlations among the plurality of pixels of the first image block based on a prediction algorithm and the index value of each pixel; and
encoding the first image block into a code according to the prediction algorithm.

2. The method as recited in claim 1, further comprising sending information of the one or more first index values, the one or more second index values and the code to a client device for decoding.

3. The method as recited in claim 1, wherein determining that the screen coding scheme is to be used for the first image block is further based on a type of content included in the first image block.

4. The method as recited in claim 1, wherein the prediction algorithm comprises at least a horizontal mode, a vertical mode and a normal mode, and wherein:
the horizontal mode indicates that pixels along a same pixel line have a same index value;
the vertical mode indicates that index values of two adjacent pixel lines are same; and
the normal mode indicates that index values of pixels in a line are predicted individually.

5. The method as recited in claim 1, wherein the one or more selected pixel values comprise:
a pixel value which frequency corresponds to one of first N highest frequencies within the distribution of pixel values, wherein N is an integer greater than zero,
a pixel value which frequency is greater than or equal to a predetermined frequency threshold, and/or
pixel values of which a total frequency is greater than or equal to a predetermined total frequency threshold.

6. The method as recited in claim 1, further comprising determining that the screen coding scheme is to be used for a second image block of the plurality of image blocks, wherein at least one major color selected for the second image block is different from the one or more major colors selected for the first image block.

7. The method as recited in claim 1, wherein the prediction algorithm comprises a plurality of context models that specify a plurality of different relationships between a current pixel and neighboring pixels of the current pixel, and determining the correlations among the index value of each pixel is further based on the plurality of context models.

8. One or more computer storage media storing executable instructions that, when executed by one or more processors, cause the one or more processors to perform acts comprising:
computing a distribution of pixel values associated with a plurality of pixels;
selecting one or more pixel values from the distribution of pixel values as one or more major colors;
determining each of the one or more major colors to cover a single pixel value or a range of pixel values based at least in part on a comparison between a pixel density about the respective major color and a predetermined density threshold, wherein:
the respective major color covers a corresponding range of pixel values if the pixel density about the respective major color is greater than or equal to the predetermined density threshold, and
the respective major color covers a corresponding single pixel value if the pixel density about the respective major color is less than the predetermined density threshold;
classifying each pixel of the plurality of pixels into a major color or an escape pixel that is excluded from the one or more major colors; and
converting a pixel value of each pixel into an index value based on which major color or escape pixel each pixel is classified as.

9. The one or more computer storage media as recited in claim 8, the acts further comprising:
after the converting, representing the index value of each pixel in form of an index value map; and
compressing a data size of the index value map by determining correlations among the plurality of pixels.

10. The one or more computer storage media as recited in claim 8, the acts further comprising determining correlations among the plurality of pixels based on a prediction algorithm.

11. The one or more computer storage media as recited in claim 10, wherein the plurality of pixels are positioned in a two-dimensional map comprising a plurality of pixel lines, and the prediction algorithm determines whether the correlations among the plurality of pixels fall into one or more line modes comprising:
a horizontal mode indicating that pixels along a portion of a same pixel line have a same index value;

a vertical mode indicating that index values of respective portions of two adjacent pixel lines are same; and a normal mode indicating that index values of pixels in a line are predicted individually.

12. The one or more computer storage media as recited in claim 11, the acts further comprising:

in response to determining that a portion of a first pixel line of the plurality of pixel lines falls into the horizontal mode, transmitting data representing the horizontal mode, a length of the portion of the first pixel line, and an index value of a first pixel of the portion of the first pixel line;

in response to determining that a portion of a second pixel line of the plurality of pixel lines falls into the vertical mode, transmitting data representing the vertical mode and a length of the portion of the second pixel line without transmitting an index value of any pixel in the second pixel line; and in response to determining that a third pixel line of the plurality of pixel lines falls into the normal mode, predicting each pixel of the third pixel line individually based on corresponding one or more neighbors, and transmitting data representing the normal mode and data indicating a prediction direction of each pixel of the third pixel line.

13. The one or more computer storage media as recited in claim 10, wherein the prediction algorithm comprises a plurality of context models.

14. The one or more computer storage media as recited in claim 8, wherein the index value comprises a single index value joining individual index values of color components for a respective pixel value.

15. The one or more computer storage media as recited in claim 8, wherein the one or more pixel values comprise:

a pixel value having a frequency corresponding to one of first N highest frequencies within the distribution of pixel values, wherein N is an integer greater than zero, a pixel value having a frequency greater than or equal to a predetermined frequency threshold, and/or pixel values of having a total frequency greater than or equal to a predetermined total frequency threshold.

16. The one or more computer storage media as recited in claim 8, wherein the plurality of pixels correspond to pixels within a block of a plurality of blocks of an image, and wherein numbers of major colors and respective values of the major colors vary from one block to another block of the plurality of blocks.

17. The one or more computer storage media as recited in claim 8, the acts further comprising sending the index value of each pixel without sending individual pixel values of the plurality of pixels.

18. A system comprising:

one or more processors;

memory storing executable instructions that, when executed by the one or more processors, cause the one or more processors to perform acts comprising:

obtaining a plurality of pixel values associated with a plurality of pixels;

selecting one or more pixel values from the plurality of pixel values as one or more major colors;

determining each of the one or more major colors to cover a single pixel value or a range of pixel values based at least in part on a comparison between a pixel density about the respective major color and a predetermined density threshold, wherein:

the respective major color covers a corresponding range of pixel values if the pixel density about the respective major color is greater than or equal to the predetermined density threshold, and the respective major color covers a corresponding single pixel value if the pixel density about the respective major color is less than the predetermined density threshold;

classifying each pixel of the plurality of pixels into a major color or an escape pixel that is excluded from the one or more major colors; and converting a pixel value of each pixel into an index value based on which major color or escape pixel each pixel is classified as.

19. The system as recited in claim 18, the acts further comprising:

after the converting, representing the index value of each pixel in an index value map; and compressing a data size of the index value map by determining correlations among the plurality of pixels.

20. The system as recited in claim 18, the acts further comprising determining correlations among the plurality of pixels based on a prediction algorithm.

* * * * *